(12) United States Patent
Brown et al.

(10) Patent No.: US 6,859,240 B1
(45) Date of Patent: Feb. 22, 2005

(54) AUTOSTEREOSCOPIC DISPLAY (75) Inventors: Daniel M. Brown, Madison, AL (US); Peter Erbach, Harvest, AL (US)

(73) Assignee: MEMS Optical Inc., Huntsville, AL (US)

( * ) Notice: Subject to any disclaimer, the term of this patent is extended or adjusted under 35 U.S.C. 154(b) by 0 days.

(21) Appl. No.: 09/492,315

(22) Filed: Jan. 27, 2000

(51) Int. Cl.$^7$ .......................................... G02F 1/1395
(52) U.S. Cl. .......................... 349/15; 349/95; 359/463; 359/466
(58) Field of Search .............................. 349/95, 15, 16; 359/463

(56) References Cited

U.S. PATENT DOCUMENTS

| | | | |
|---|---|---|---|
| 4,717,949 A | | 1/1988 | Eichenlaub |
| 4,957,351 A | | 9/1990 | Shioji |
| 4,959,641 A | | 9/1990 | Bass et al. |
| 5,193,000 A | | 3/1993 | Lipton et al. |
| 5,392,140 A | * | 2/1995 | Ezra et al. .................... 349/15 |
| 5,493,427 A | | 2/1996 | Nomura et al. |
| 5,528,420 A | | 6/1996 | Momochi |
| 5,767,898 A | | 6/1998 | Urano et al. |
| 5,808,599 A | * | 9/1998 | Allio ......................... 345/139 |
| 5,822,125 A | | 10/1998 | Meyers |
| 5,838,494 A | | 11/1998 | Araki |
| 5,956,001 A | * | 9/1999 | Sumida et al. ................ 345/55 |
| 6,091,482 A | * | 7/2000 | Carter et al. .................. 355/79 |
| 6,307,585 B1 | * | 10/2001 | Hentschke ................... 348/51 |

FOREIGN PATENT DOCUMENTS

| | | |
|---|---|---|
| DE | 19840972 A1 | 9/1998 |
| EP | 0354851 | 2/1990 |
| EP | 0597629 A1 | 5/1994 |
| EP | 0654701 A1 | 5/1995 |
| EP | 0726482 A2 | 8/1996 |
| EP | 0773462 A2 | 5/1997 |
| JP | 57067393 | 4/1982 |
| JP | 57087291 | 5/1982 |
| JP | 03040692 | 2/1991 |
| JP | 04035192 | 5/1992 |
| JP | 08322067 | 3/1996 |
| WO | WO 9209914 | 6/1992 |
| WO | WO 9810402 | 3/1998 |

OTHER PUBLICATIONS

Autostereoscopic 3–Television, Part II, Electronics, Scripta Technica. New York, US vol. 76, No. 8, Aug. 1, 1993 pp. 89–97.

* cited by examiner

Primary Examiner—Kenneth Parker
(74) Attorney, Agent, or Firm—Keady, Olds & Maier, PLLC (57) ABSTRACT

An autostereoscopic display and method of displaying multidimensional images involves a first lenticular array preferably of cylindrical lenses positioned between a viewer and a pixel array, and a second lenticular array also preferably of cylindrical lenses positioned between the first lenticular array and the viewer. The pixel array includes several pixel groups that project images through corresponding groups of first lenses within the first lenticular array. A pitch of the lenses within the second lenticular array differs from a pitch of the lenses in the first lens groups within the first lenticular array. The display can be manufactured or retrofit with the first and second lenticular arrays. By use of the first lenticular array, light from plural color pixels may be focussed to a single point so that color subpixels arranged in a direction transverse to the direction of the cylindrical lenses of the first lenticular array may be focussed to a single point on the secondary lenticular array and then as a single image to the user.

23 Claims, 8 Drawing Sheets

AUTOSTEREOSCOPIC DISPLAY

BACKGROUND OF THE INVENTION

1. Field of the Invention

The present invention is directed to an autostereoscopic display and method of displaying multidimensional images thereon. More particularly, the autostereoscopic display of the present invention includes two lenticular arrays positioned between a viewer and a pixel array. Lenses within the first lenticular array closest to the pixel array have a pitch that corresponds to the pitch of the color pixels of pixel array. Lenses within the second lenticular array have a different pitch than corresponding pixel groups within the pixel array. An autostereoscopic display in accordance with the present invention is particularly advantageous for creating stereoscopic displays in conjunction with color pixel arrays.

2. Description of the Related Art

Conventionally, three-dimensional displays of images have been achieved by using stereoscopic displays. A stereoscopic display is a display that provides multidimensional image cues to a viewer by combining two alternative two-dimensional views of the same object or scene. Each view is observed by one of the viewer's eyes and the two views are subsequently integrated by the human visual system to form a three-dimensional image perceived by the viewer. A simple example is the integration of overlapped red and green images by a viewer wearing glasses with a red-color filter over one eye and a green-color filter over the other eye.

An autostereoscopic display is a form of stereoscopic display that requires no special glasses or head-mounted equipment to bring the alternative views to each of the viewer's eyes. Conventional autostereoscopic displays have been implemented based on light emitting lines that direct interlaced left and right eye images to a viewer's left and right eyes, respectively. Such an implementation requires construction of a specialized flat panel display incorporating light emitting lines capable of replacing conventional backlighting sources.

Other conventional autostereoscopic displays have been proposed with lenses positioned in alignment with display picture elements, such that interlaced left and right eye images directed at fixed angles do not necessarily represent a viewer's actual left and right eye viewing zones. Conventionally, this implementation also required construction of a specialized flat-panel display incorporating cylindrical lenses embedded within the display picture elements structure. Furthermore, because the lenses were aligned, interference pattern noise or moiré patterns result from spatial mismatches between pixel edges and cylindrical lens edges when viewed off-axis. In addition, the alignment results in projection of images outside the viewer's proper left and right eye viewing zones.

A recently developed system comprises a display and displaying method that substantially obviates many of the problems, limitations and disadvantages associated with the above-discussed related art. That device and method disclosed provides real-time autostereoscopic viewing of multidimensional images using conventional or existing flat screen display technology for black and white or color images. However there are some limitations associated with that system and method when employed in connection with color pixel displays.

Color displays are normally constructed with pixels each comprising a plurality of color elements (such as red, green, blue) arranged alongside each other along a generally horizontal line of the display as oriented in its position of intended use. Because of this it is common in such conventional displays of the green pixels to vertically align with each other. The red and blue pixels are often aligned in a similar fashion. In order to create stereoscopic displays in conjunction with a color pixel display, the recently developed system requires the display to be rotated ninety degrees, so that the color elements of the pixels are arranged vertically one above the other, in order to orient the pixels appropriately with respect to a lenticular array of the apparatus. This then requires modification to the driving convention for the display. It also limits the extent to which existing or conventional displays can be adapted to provide stereoscopic images. That is, it is not a simple matter to adapt a standard display to provide stereoscopic images because the display must be rotated ninety degrees to an orientation in which it is not intended to be used.

The present invention overcomes this limitation by providing an improved autostereoscopic display apparatus and method. The apparatus and method of the present invention is particularly adapted for use in displaying stereoscopic images using a conventional display array comprising color pixels.

Other and further objects, features and advantages of the present invention will be set forth in the description that follows, and in part, will become apparent from the detailed description, or may be learned by practice of the invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

At FIGS. 1A through 5 illustrate a recently developed apparatus and method for creating stereoscopic images. More particularly;

FIGS. 6–7B illustrate the improved features of the present invention. Particularly;

DETAILED DESCRIPTION OF THE PREFERRED EMBODIMENTS

Reference will now be made in detail to the preferred embodiments of the present invention, examples of which are illustrated in the accompanying drawings. In the drawings, redundant description of like elements and processes, which are designated with like reference numerals, is omitted for brevity.

Figure 1A:
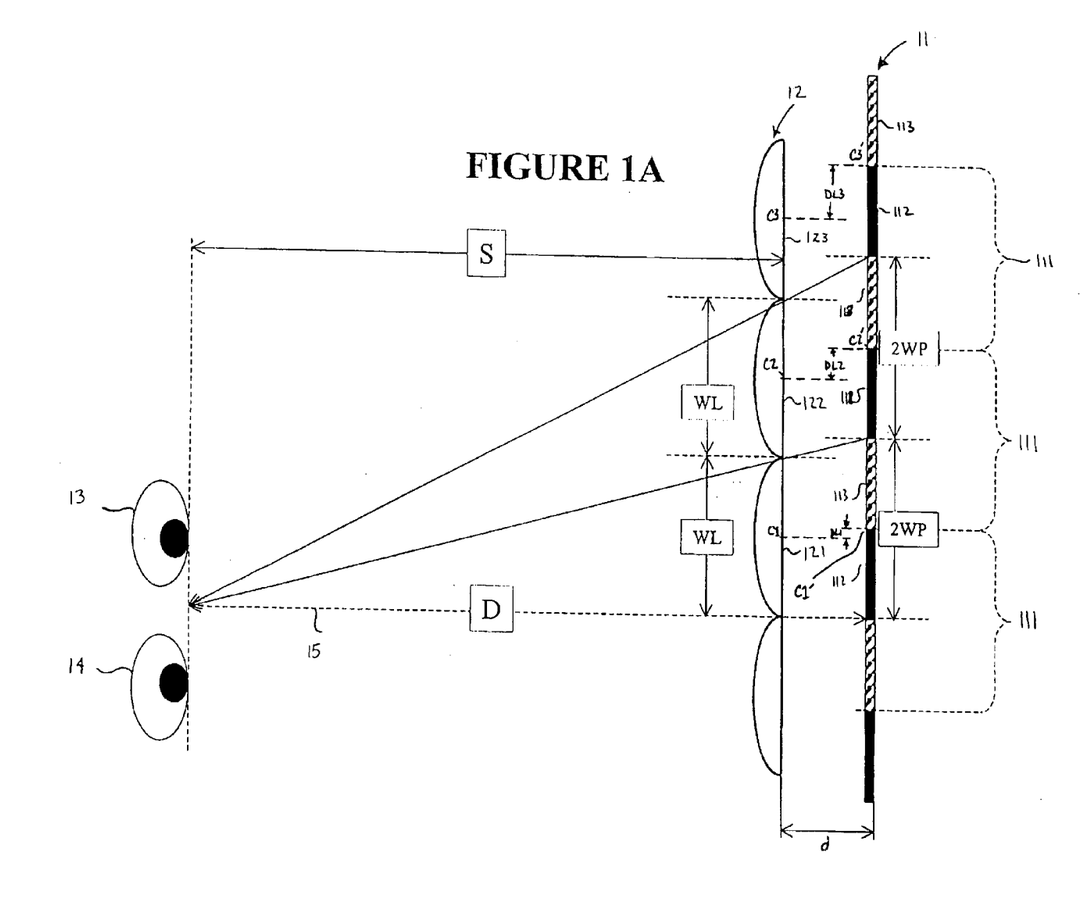
FIGS. 1A and 1B are schematic top views illustrating the structural orientation of a pixel array and a lenticular array in first and second exemplary embodiments of the previously developed system, respectively.

For a complete understanding of the present invention, reference is first made to the previously developed autostereoscopic display for an understanding of some of the underlying principles of structure and operation. FIG. 1A illustrates a top view of one embodiment of that autostereoscopic display.

The autostereoscopic display shown in FIG. 1A includes a pixel array 11 having several pixel groups 111 and a lenticular array 12 that is positioned adjacent pixel array 11. Pixel array 11 and lenticular array 12 are separated by a distance d that varies based on the desired or anticipated distance S between the viewer 13–14 and the front of the autostereoscopic display, as will be described later with respect to equations (4)–(5). The space between pixel array 11 and lenticular array 12 is occupied by air, a vacuum or any optically translucent material such as glass.

Each pixel group 111 within pixel array 11 includes plural pixel columns. For instance, in FIG. 1A, each pixel group 111 is shown including two (2) pixel columns—left eye pixel column 112 and right eye pixel column 113. A pitch of the pixel groups 111 is defined by the center-to-center spacing of the pixel groups 111, usually corresponding to a width of the pixel columns 112–113 therein. For instance, in the display of FIG. 1A, the pitch of the pixel groups 111 within pixel array 11 is 2WP, where WP is the width of each pixel column 112, 113 within the pixel array 11. The pitch of a pixel group 111 having n pixel columns is therefore usually nWP, but may vary from nWP if lenses within the lenticular array 12 are overlapping or separated.

Lenticular array 12 includes several adjacent lenses, each lens 121–123 within lenticular array 12 corresponding to different pixel columns 112–113 within the pixel groups 111 of the pixel array 11. The pitch of the lenses 121–123 within lenticular array 12 is defined by a center-to-center spacing of adjacent lenses 121–123 within lenticular array 12, usually corresponding to a width WL of those lenses 121–123. However, like the pitch of the pixel groups, the pitch of lenses within lenticular array 12 may not correspond to the width WL of those lenses 121–123 if the lenses are overlapping or separated since their width WL would not correspond to the center-to-center spacing. Nevertheless, for convenience, the pitch of the pixel groups 111 is referred to as 2WP and the pitch of the lenses within lenticular array 12 is referred to as WL hereinafter.

The pitch WL of the lenses 121–123 within lenticular array 12 necessarily differs from the pitch 2WP of the corresponding pixel groups 111 within pixel array 11, the pitch of lenses 121–123 being smaller than the pitch of the pixel groups 111 in the embodiment shown in FIG. 1A. Due to the difference in pitch between the lenses 121–123 and corresponding pixel groups 111, a center of at least one of the lenses 121–123 within lenticular array 12 and a center of corresponding pixel columns 112–113 within pixel array 11 are offset with respect to the long axis of the cylindrical lenses within lenticular array 12. For instance, in FIG. 1A, lens 121 of lenticular array 12 corresponds to a pair of pixel columns 112–113 located adjacent to eye bisector 15, and lens 122 corresponds to a next pair of pixel columns 112–113 that are displaced from eye bisector 15 by the pixel columns 112–113 corresponding to lens 121. As shown, a center C1 of lens 121 and a center C1' of corresponding pixel columns 112–113 are offset relative to eye bisector 15, and a center C2 or lens 122 and a center C2' of corresponding pixel columns 112–113 are offset relative to eye bisector 15.

Furthermore, because the pitch WL of lenses 121–122 is smaller than the pitch WP of pixel groups 111, the offset of the lenses 121–123 increases in either direction away from an aligned point, e.g., from eye bisector 15 in FIG. 1A. For instance, the center C1 of lens 121 is linearly offset from the center C1' of corresponding pixel columns 112–113 by a distance DL1, such that:

$$DL1 = (2WP - WL)/2 \qquad (1),$$

where 2WP represents the pitch of the pixel groups 111 in which array 11, and WL represents the pitch of the lens 121–123 within lenticular array 12, as discussed above.

Similarly, the center C2 of lens 122 is linearly offset from the center C2' of corresponding pixel columns 112–113 by a distance DL2, such that:

$$DL2 = 2(2WP - WL)/2 = 2WP - WL \qquad (2).$$

That is, the distance between the centers of lenses 121–122 and corresponding pixel columns 112–113 is multiplied based on a number of lenses 121–123 separating the lens of interest from a lens that is linearly aligned with its corresponding pixels columns. Thus, when N lenses separate a lens of interest from an aligned lens/pixel group combination, the offset DLN between the center of the Nth lens and the center of the Nth group of pixel columns 112–113 can be calculated based on equation (3) as follows:

$$DLN = N/2(2WP - WL) \qquad (3).$$

The orientation of pixel array 11, lenticular array 12 and viewer eyes 13 and 14 is described geometrically according to equation (4):

$$\frac{S}{WL} = \frac{(S+d)}{2WP}, \qquad (4)$$

where S represents the distance from viewer eyes 13 and 14 to lenticular array 12, WL represents the pitch of lenses 121–123 within lenticular array 12 as described above, d represents a distance of separation between lenticular array 12 and pixel array 11, and 2WP represents the pitch of the pixel groups 111 within pixel array 11 as described above. Thus, solving for pitch WL, the center-to-center spacing WL of the lenses 121–123 within lenticular array 12 can be determined as follows:

$$WL = \frac{S(2WP)}{S+d}. \qquad (5)$$

That is, anticipating both the distance S between a viewer and the lenticular array 12 located at the front of the autostereoscopic display and the desired separation between pixel lens arrays 11 and 12, equation (5) can be used to determine an appropriate pitch WL for lens 121–123 within a lenticular array of the display. The desired separation d between the pixel and lenticular arrays 11 and 12 may be determined based on various criteria such as the size and/or appearance of the resulting display. Typically, the separation d is representative of the focal length of the lenses in the lenticular array.

Parameters that have been used to create and orient an autostereoscopic display in accordance with the above-described design include a distance d of 2 mm, a distance DL of approximately of 1 $\mu$m, a pitch WP of approximately 250 $\mu$m, a pitch WL of approximately 500 $\mu$m, a distance D of approximately 500 mm, and an approximate eyeball separation of 70 $\mu$m.

The lenticular array described above may be manufactured or retrofitted for either an entire display or only a selected portion of a display.

Figure 1B:
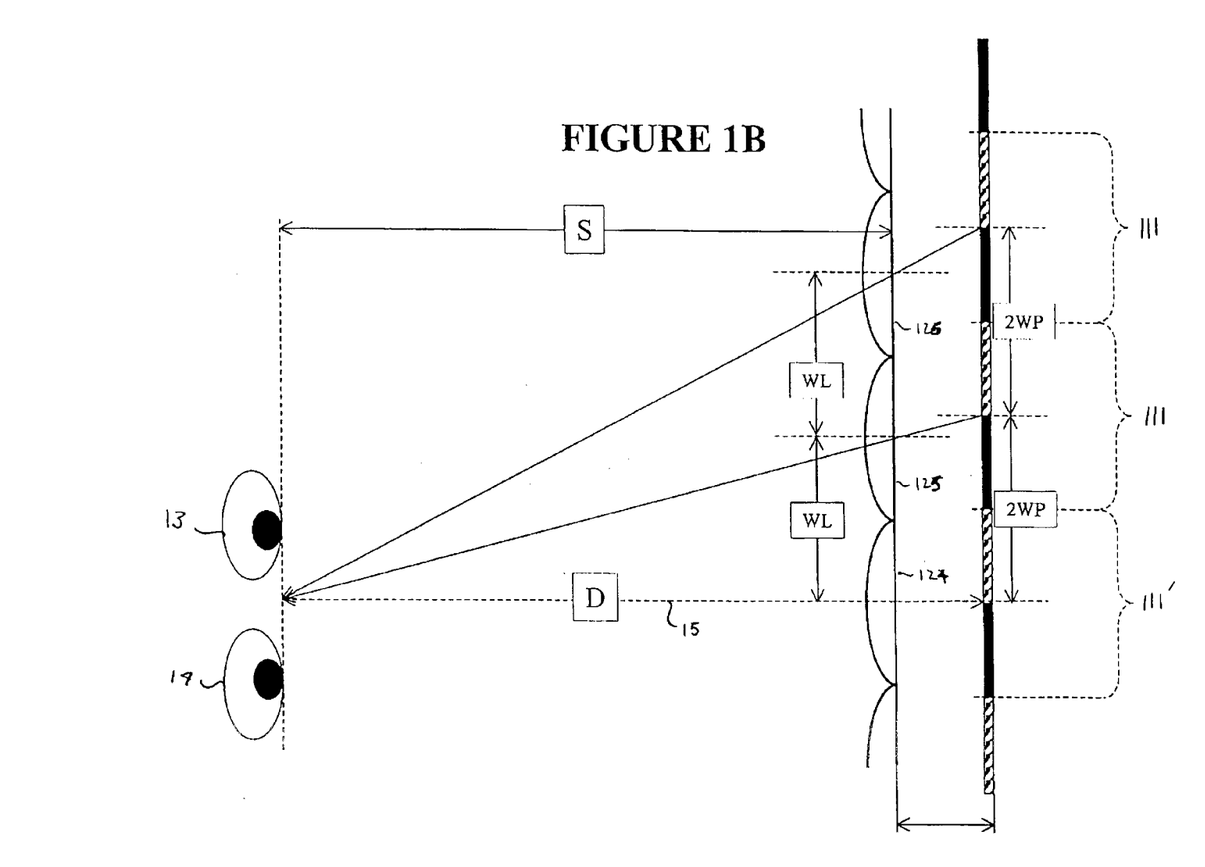

FIG. 1B illustrates a top view of an autostereoscopic display structured and arranged in accordance with a second embodiment of the previously developed system and method. In many respects, the autostereoscopic display of FIG. 1B resembles that of FIG. 1A. Accordingly, the reference numerals shown in FIG. 1B and in the following discussion relate only to aspects of that display which differ from the display shown in FIG. 1A.

The displays shown in FIGS. 1A and 1B differ with respect to the alignment of the lenses within lenticular array 12 relative to the pixel groups 111 within pixel array 11, FIG. 1B illustrating a configuration in which the position of the lenticular array 12 is shifted from the position shown in FIG. 1A relative to pixel array 11. Specifically, in FIG. 1B, the center of lens 124 within lenticular array 12 is aligned with the center of pixel group 111' within pixel array 11 with respect to the long axis of the cylindrical lenses within lenticular array 12. In FIG. 1B, this alignment is achieved at eye bisector 15. The alignment is preferably achieved at the center of the autostereoscopic display. Because of this alignment, the lenses 124–126 of FIG. 1B, each correspond to pixel columns 112–113 within a single pixel group 111 or 111', in contrast with the lenses of FIG. 1A which each correspond to pixel columns 112–113 in different pixel groups 111. Nevertheless, the pitch WL of lenses 124 and 126 remains smaller than the pitch 2WP of corresponding pixel columns 111 and 111', such that lenses 125–126 other than central lens 124 are offset from their corresponding pixel columns 111 with respect to the long axis of cylindrical lens within lenticular array 12. Therefore, for reasons similar to those discussed above with respect to equations (1)–(3), the offset between the center of lenses 125–126 and their corresponding pixel columns 111 increases as the distance from central lens 123 increases.

Figure 2:
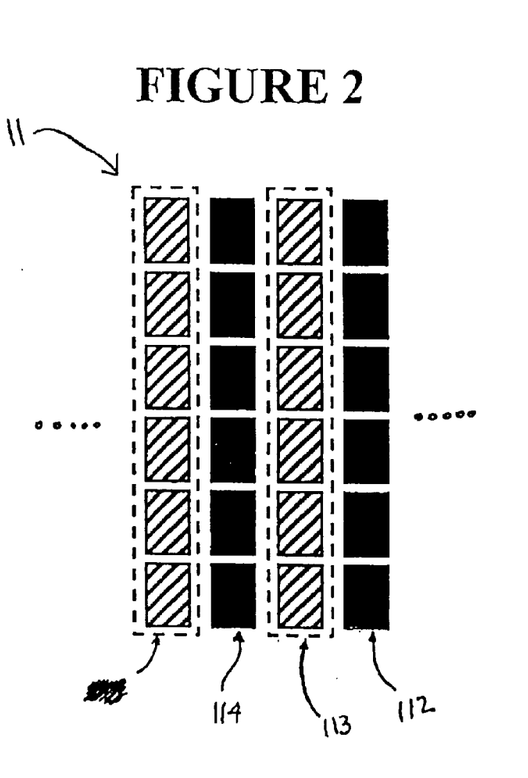
FIG. 2 is a schematic front view illustrating an example of a pixel array structured and arranged to simultaneously display two views of an image, thereby enabling an autostereoscopic display according to either of those first and second embodiments.

FIG. 2 illustrates a front view of a pixel array arranged to simultaneously display two views of an image to enable an autostereoscopic display arranged according to either of the embodiments shown by FIGS. 1A and 1B. Left and right view information is arranged on the pixel array 11 such that images directed toward the left eye 13 and images directed toward the right eye 14 are spatially interlaced. Thus, the left and right eye images are displayed on alternating pixel columns 112, 113 within the pixel array 11. Although the pixel array 11 includes several pixel columns, a sample of only four pixel columns from within pixel array 11 is illustrated in FIG. 2.

The pixel array 11 of FIG. 2 includes several pixel columns, the pixel columns being arranged in parallel to the long axis of cylindrical lenses within lenticular lens array 12. That is, the lenses are arranged such that the left eye 13 perceives the image created by joining all the left eye pixel columns (designated by dark shading, e.g., pixel columns 112 ), and the right eye perceives the image created by joining all the right eye pixel columns (designated by diagonal lines, e.g., 113).

The resolution of the stereoscopic device is related to the number of pixel columns in the display and the number of pixel columns per pixel group. A flat screen display with P pixel columns that each have Q pixels has a non-autostereoscopic image resolution of P×Q pixels. By contrast, the same flat screen display has an autostereoscopic image resolution equal to $$\frac{P \times Q}{n}$$

pixels, assuming n views in the autostereoscopic display. For instance, the embodiments illustrated in FIGS. 1A–2 would have an image resolutions of $$\frac{P \times Q}{2}$$

pixels since each pixel group 111 has two (2) pixel columns 112–113 to achieve two (2) separate views.

Figure 3:
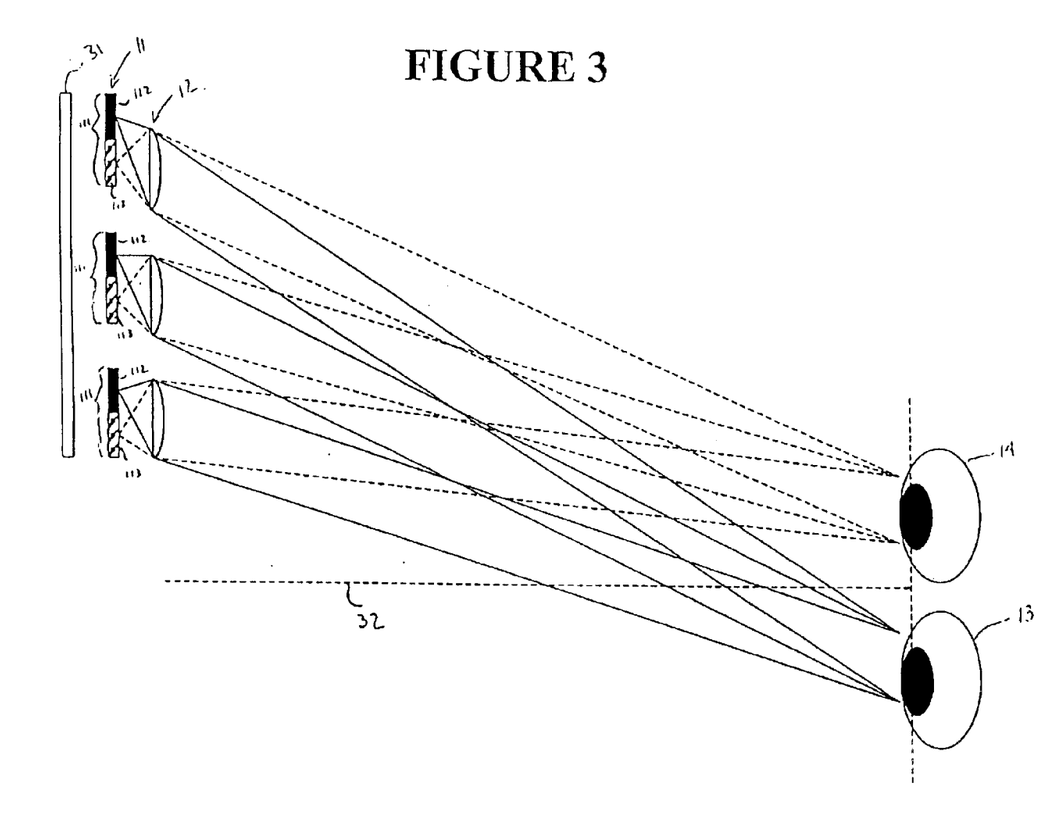
FIG. 3 is a schematic top view illustrating light beams projecting two views of a single image toward a viewer using an autostereoscopic display arranged according to either of such first and second embodiments.

FIG. 3 illustrates light beams projecting two views of a single image toward a viewer using an autostereoscopic display arranged according to either the FIG. 1A or the FIG. 1B embodiment. The structural components of FIG. 3 are similar to those shown in FIGS. 1A and 1B. In addition, FIG. 3 shows a back-illumination source 31 which illuminates pixels within pixel array 11. Lenses within lenticular array 12 transfer the pixel information toward the viewers left 13 and right 14 eyes in a preferred viewing direction which is left to right in FIG. 3, and is parallel to line 32 bisecting the viewer's eyes. The separations between the pixel groups 111 within pixel array 11 are exaggerated in FIG. 3 for clarity.

As illustrated, left and right view information is arranged on the flat screen display pixels 112–113 such that an image to be directed toward the left eye and an image to be directed toward the right eye are spatially interlaced. Consequently, the lenses are arranged such that the left eye 13 perceives the image created by joining all the left eye pixel columns 112 (designated by shaded pixel columns), and the right eye 14 perceives the image created by joining all of the right eye pixel columns 113 (designated by diagonal lines).

Figure 4A:
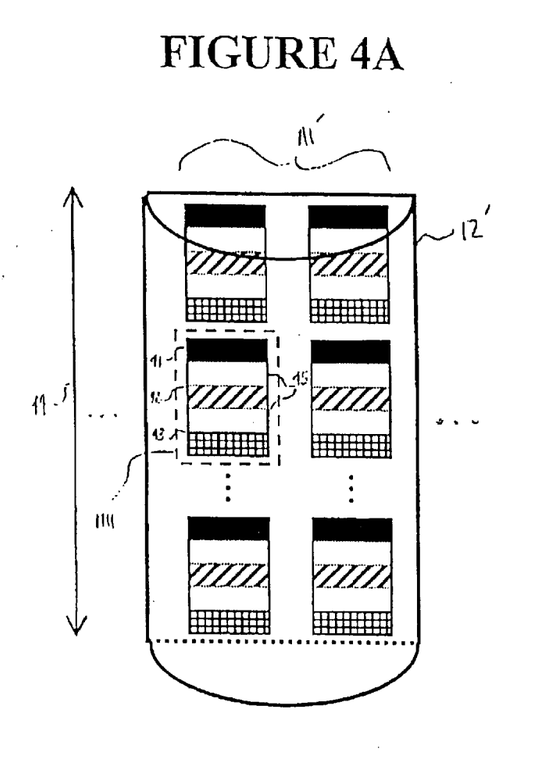
FIGS. 4A and 4B respectively illustrate schematic front and top views of an autostereoscopic display according to either of such first and second embodiments of the previous system in which pixels of the autostereoscopic display each project multiple components (e.g., red, green, blue) of an image.
Figure 4B:
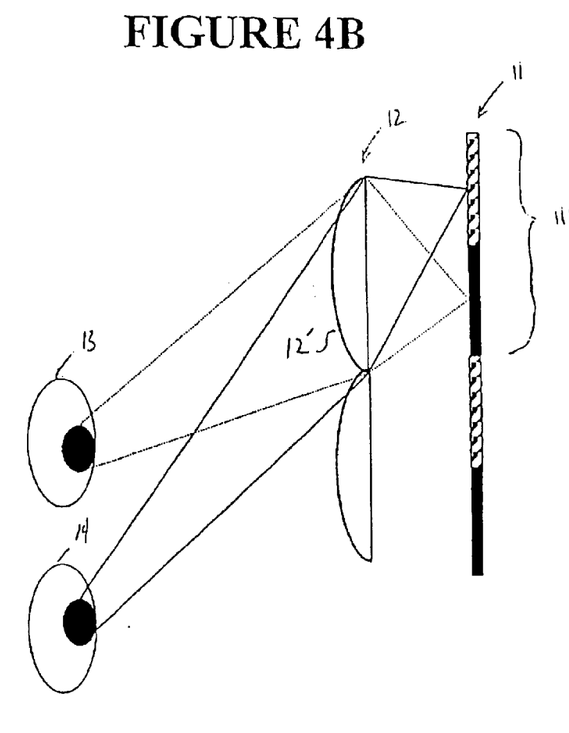

FIGS. 4A and 4B respectively illustrate front and top views of an autostereoscopic display according to either of the above-discussed embodiments as applied to a color display. Pixels within the autostereoscopic display of FIGS. 4A and 4B each project multiple components (e.g., red, green, blue) of an image. Specifically pixels within each pixel column of the display include various color components displaced in a vertical direction that is parallel to a long axis of the cylindrical lenses within lenticular array 12. Conventionally, the respective components of pixels as illustrated are arranged horizontally in displays positioned in the intended orientation. To achieve the spatial relationship illustrated in FIGS. 4A–B it is necessary to rotate such displays ninety degrees to re-orient the pixels in the manner shown. This rotation of the display from its intended orientation requires that the driving convention for the display be modified.

FIG. 4A shows one particular lens 12' from within lenticular array 12, and a corresponding pixel group 111' from within pixel array 11. As demonstrated by pixel 1111, each pixel within the display includes multiple color components 41–43. For instance, pixel 1111 includes red color component 41, green color component 42 and blue color component 43, each of these color components being displaced in a direction parallel to the long axis 44 of the lens 12'.

In the configuration shown by FIG. 4A, the color components 41–43 are physically separated in the pixels 1111 of the pixel array 11, but are not physically separated at the perceivable viewing plane. Therefore, the viewer perceives a three-dimensional color image. The space 45 between the color components may be removed such that the color components are adjacent in each pixel.

The autostereoscopic displays described with reference to FIGS. 1A–4B present two views to a viewer, one view for the left eye and another view for the right eye. In order to provide more than two views, each pixel group 111 within the pixel array 11 must include a number of pixel columns (e.g., 112–113) corresponding to the desired number of views. For instance, to provide eight views, each pixel group 111 within the pixel array 11 would include eight pixel columns. As a consequence of increasing the number of pixel columns within each pixel group 111, the center of the lenses (e.g., 121–123) is increasingly offset from a center of the corresponding pixel group 111 by a distance DL' away from an aligned lens/pixel group combination, such that:

$$DL'=nWP-WL \qquad (6),$$

where n represents the number of different views that result from having n pixels in each pixel group 111, WP represents the width of each adjacent pixel column, and WL represents the width of a lens within lenticular array 12. Similar to the distance DL described with respect to FIG. 1A, the distance DL' is a multiple based on the number of lenses separating the lens of interest from an aligned lens and pixel group combination. Thus, when N lenses separate the lens of interest from an aligned combination, misalignment DL' of the Nth lens relative to the Nth pixel group can be calculated based on the following:

$$DL'=N(nWP-WL) \qquad (7).$$

Furthermore, when multiple views are available, the orientation of pixel array 11, lenticular array 12, and eyes 13 and 14 can be described geometrically as follows:

$$\frac{S}{WL} = \frac{(S+d)}{nWP}. \qquad (8)$$

Thus, the center-to-center spacing WL of the lenses within lenticular array 12 becomes:

$$WL = \frac{S(nWP)}{(S+d)}. \qquad (9)$$

Figure 5:
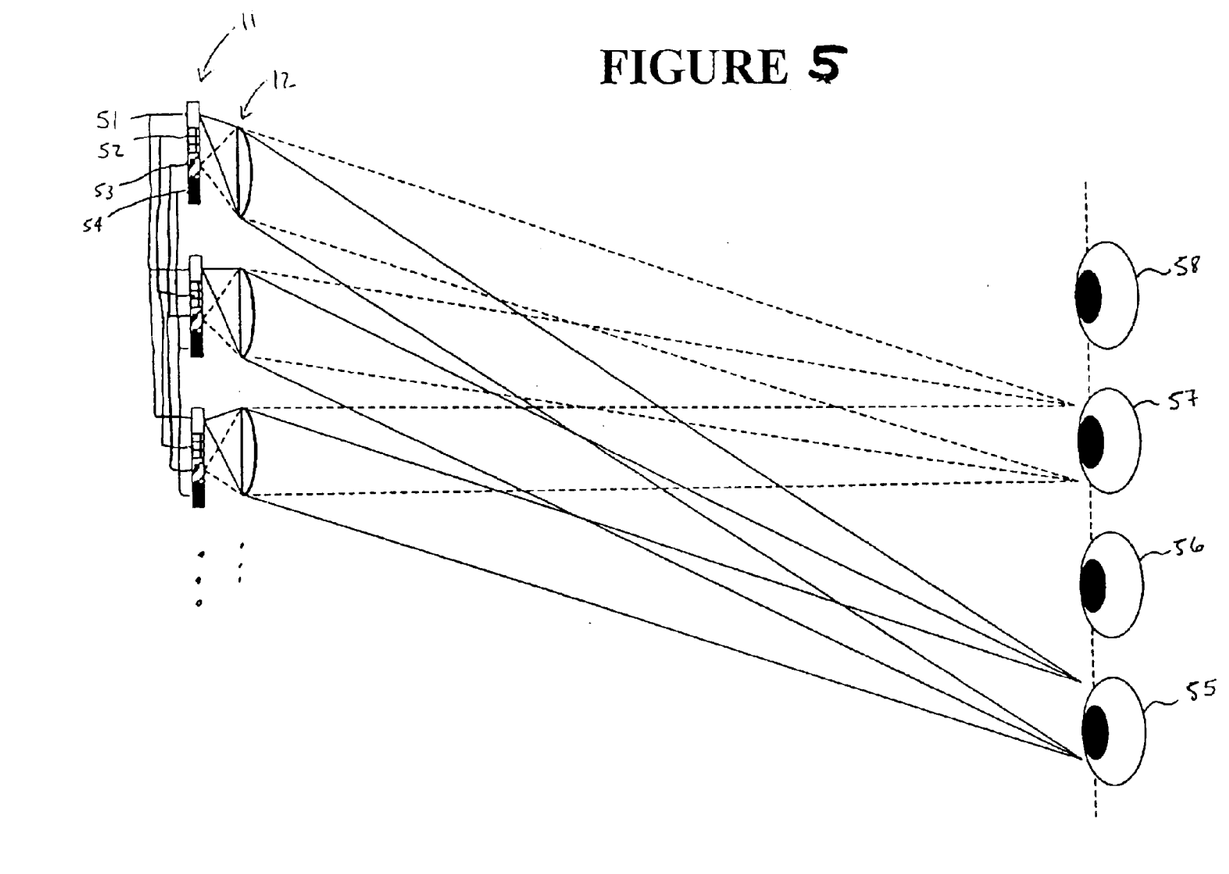
FIG. 5 is a schematic top view illustrating an autostereoscopic display capable of displaying more than two different views of a single image to a viewer according to a third embodiment of the previous system.

FIG. 5 illustrates an autostereoscopic display capable of displaying more than two different views of a single image to a viewer according to the principles set forth above. The display of FIG. 5 is constructed and arranged to apply the concepts described with respect to FIGS. 1A–4B to provide multiple views to a viewer. For instance, as shown in FIG. 5, each pixel group 111 within pixel array 11 includes more than two pixel columns 51–54. In fact, in the example shown in FIG. 5, each pixel group 111 includes four (4) pixel columns 51–54, thus enabling four different views of a single scene for the viewer.

In FIG. 5, an eye positioned according to position 55 will perceive the image created by joining pixel columns 51 in each of pixel groups 111. Similarly, an eye positioned according to position 56 will perceive the image created by joining pixel columns 52 in each of pixel groups 111, an eye positioned according to position 57 will perceive the image created by joining pixel columns 53 in each of pixel groups 111, and an eye positioned according to position 58 will perceive the image created by joining pixel columns 54 in each of pixel groups 111.

Figure 6:
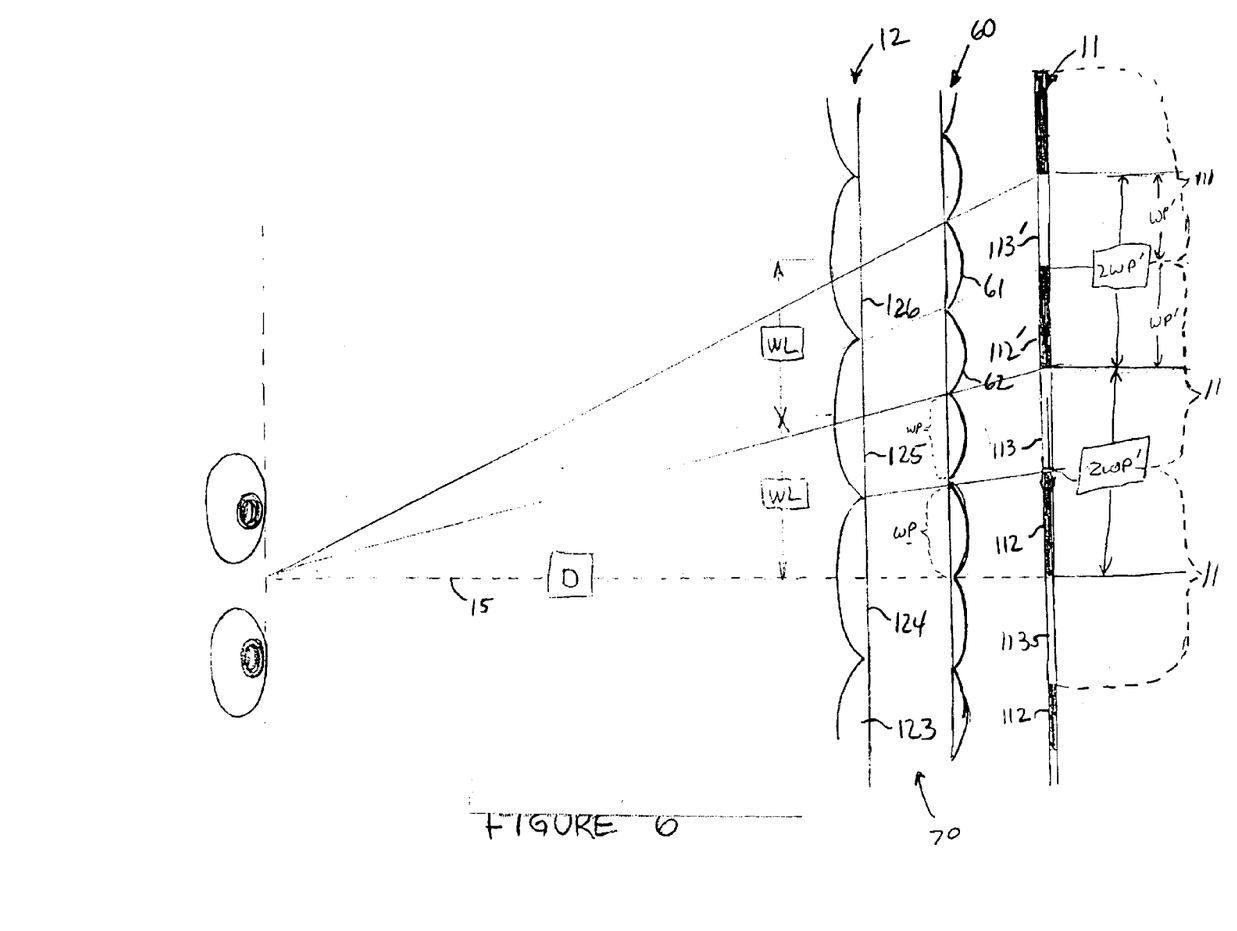
FIG. 6 is a schematic top view illustrating the structural orientation of a pixel array and first and second lenticular arrays in accordance with an embodiment of the present invention.
Figures 7A, 7B:
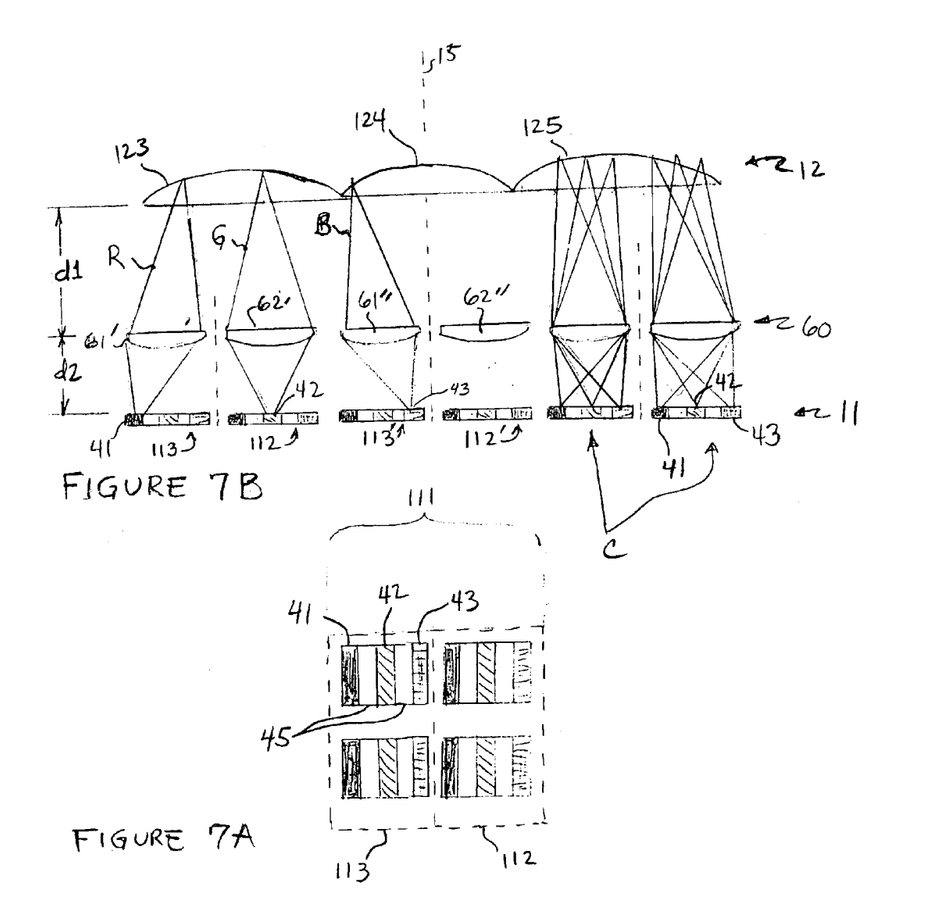
FIG. 7A is a schematic front view illustrating an example of a color pixel array structured to simultaneously display two views of an image in accordance with the invention.
FIG. 7B is a schematic top view of an autostereoscopic display illustrating portions of the apparatus of FIG. 6 in greater detail.

FIGS. 6–7B illustrate an improvement to the system and method described above with respect to FIGS. 1–5. The invention as illustrated in FIGS. 6–7B is similar in many respects in structure and function to the subject matter described above with respect to FIGS. 1–5. To the extent of similarities, corresponding reference numerals are employed in FIGS. 6–7B, and the following discussion relates primarily to aspects of the present invention which differ from the subject matter of FIGS. 1–5.

FIG. 6 illustrates a pixel array 11 comprising a plurality of pixel groups 111. Each pixel group includes at least a pair of pixels 112 and 113. As discussed above, pixels 112 of array 11 may be employed to generate a left eye image, while pixels 113 may be employed to generate a right eye image. In accordance with the teachings of the present application, each pixel 112, 113 includes a set of color subpixels (subpels) corresponding to the color components 41–43 described above with respect to FIG. 4A. These color subpixels, described in further detail in FIGS. 7A, 7B, may comprise one subpel for the red color component 41, one subpel for the green color component 42 and one subpel for the blue color component 43. Of course, it is within the contemplation of the present invention that a single pixel 112, 113 may have more than three subpels. For example, since green is a larger portion of the output of a video image than red or blue, a single pixel may have two green subpels.

The device of FIG. 6 further includes a lenticular array 12, as described above with respect to FIGS. 1A–1B. Another lenticular array 60 is interposed between pixel array 11 and lenticular array 12. For reasons which will become more apparent from the following discussion, the lenses of array 60 will be called primary lenses in this apparatus, while lenses of array 12 will be called secondary lenses.

The pitch of the lenses in the primary array 60 corresponds to the pitch of pixels (such as 112, 113) in array 11, and the lenses of array 60 are positioned in alignment with the respective pixels of the array so that a single lens of the array 60 collects light emitted from a complete set of subpels. Preferably, the pitch of the lenses 61,62 of the primary array 60 should be adjusted to align the lenses of the array 60 to the pixels 112, 113 of the pixel array 11 from the perspective of the user as illustrated in FIG. 6 and in the same manner described in further detail with respect to the secondary lens array 12 as described in further detail in FIG. 1A. This corrects for the parallax that would otherwise be created due to the relationship of the user's eyes to the display. While it is not strictly necessary to correct for this parallax, failure to adjust the pitch will damage or destroy the stereoscopic image as the parallax increases. Thus, the stereoscopic effect will be impaired or destroyed in areas spaced from the display center.

In FIG. 6, a lens 61 is positioned opposite to and in alignment with pixel 113' and its constituent subpels. The pitch of lens 61 is WP while that of pixel 113' is WP', as illustrated. Similarly, a lens 62 is opposite and, from the users perspective, aligned with pixel 112', with lens 62 having pitch WP while pixel 112' has pitch WP'.

Preferably the individual lenses 61 should be aligned so that the individual subpels of a single pixel 112, 113 are aligned with a single lens 61. This is in practice rather easy to achieve so long as the pixels 112, 113 and lens 61 are constructed with the proper pitch relationship described herein. When misalignment is present it is easily visible due to the presence of undesired visual artifacts such as moiré patterns. In practice the array of primary lenses 60 and array of secondary lenses 12 are constructed as an integral lens unit (generally referenced as element 70) as will be described in greater detail. This integral lens unit can, in practice, be manually adjusted until the display "looks right" (has no visible undesired artifacts). Care must be taken that the subpixels of an individual pixel 112, 113 all be aligned with the same primary lens 61, 62. For example, alignment of the subpixels for the green and blue components 42,43 of one individual pixel 112 with the red component 41 of another individual pixel 113 will partially destroy stereoscopy since the green and blue components of one stereoscopic image will then be aligned with the red component of another stereoscopic image.

The lenses of array 60 may be similar in kind to the lenses of array 12. In the embodiment illustrated, the lenses in array 60 are cylindrical lenses, the longitudinal axes of which are parallel to the longitudinal axes of lenses in array 12, that is transverse to the direction the color subpels are arrayed. Thus lenses are vertical in orientation when used with a conventional display panel, for example a liquid crystal display panel of a conventional type laptop computer. In accordance with the invention as illustrated in FIG. 6, images from pixels 112, 113 of pixel groups 111 are projected through lenses 61, 62, etc. in array 60. Thus, the lenses in array 60 corresponding to pixel groups in pixel array 11 may be considered as forming lens groups.

Images projected through lenses 61, 62, etc. in array 60 are then projected through lenses in array 12, as described above with respect to FIGS. 1–5. Thus, unlike the devices illustrated with respect to FIGS. 1–5, the images generated by each pixel group is not projected directly from the pixels to a lens of lenticular array 12. Rather, the image generated by each pixel group passes first through an associated group of lenses of lenticular array 60, and then passes through a respective lens of array 12. The lenses of the array 60 are preferably designed to focus the image from each of the subpels of a single pixel on the surface of one of the secondary lenses 123–126. In practice the focal point is generally set to an approximation of the surface of the lens 123–126 since varying the point of intersection along the lens surface varys the desired focal point and a single fixed focal depth is generally used.

This structure and operation of the present application is suitable for any display where plural pixel elements are associated with a common stereoscopic image point and thus must be directed to a common point on each secondary lens 123–126. However, the use in color displays is primary contemplated embodiment.

FIG. 7A illustrates an exemplary pixel group 111 comprising two groups of pixels 112, 113. This is similar in some respects to the subject matter illustrated in FIG. 4A. However, there is an important difference.

As noted above, the arrangement of color pixels illustrated in FIG. 4A, wherein the color components of each pixel are arranged sequentially in a vertical direction, results from rotating a conventional color pixel display 90° from its intended orientation in use. This aligns the plural colors along a line parallel to each single cylindrical stereoscopic secondary 123–124. As illustrated in FIG. 7A, in accordance with the present invention, the normal orientation of the pixel display is desirably maintained. Thus, the respective color portions 41, 42, 43 are arranged in sequence in a horizontal direction, in keeping with the standard orientation of the display. In accordance with the present invention, it is not necessary to rotate the display in order to obtain satisfactory stereoscopic images.

FIG. 7B is a top view of a portion of the apparatus of FIG. 6. FIG. 7B illustrates central lens 124 of array 12 together with lenses 123 and 125 to either side. A plurality of pixel groups each comprise a pair of pixels 112, 113, as described above. The pixels in each group are aligned with a pair of primary lenses such as 61', 62' or 61", 62", forming groups of primary lenses in array 60.

Each group of primary lenses in array 60 is associated with a lens 123, 124, etc. of lenticular array 12 in substantially the same manner that pixel groups are associated with lenses of array 12 in the systems illustrated in FIGS. 1A–1B. Specifically, primary lens group 61' 62' is associated with lens 123. Primary lens group 61", 62" is associated with lens 124. The remaining pair of primary lenses in FIG. 7B (unnumbered) is associated with lens 125.

Light projecting from each of the respective pixels 112, 113 is projected through a corresponding primary lens of array 60. The images are focused by primary lenses of array 60 onto the associated secondary lenses of array 12. As discussed above with respect to the systems of FIGS. 1–5, the image information from each group of primary lenses, passing through secondary lenses in lenticular array 12, presents stereoscopic images to a viewer of the display.

The presence of the primary lenses in array 60, associated with each respective pixel, facilitates display of stereoscopic color images using a color pixel display in its ordinary and intended orientation, wherein the color components are arranged sequentially along a horizontal direction. In the exemplary embodiment, projection of red, green and blue portions of a color image are illustrated schematically in FIG. 7B, which also illustrates schematically projection of a composite image from a pixel.

Projection of a red component 41 from its associated subpixel is illustrated in conjunction with the left-most pixel 113 in FIG. 7B. As illustrated, the red component subpixel 41 of pixel 113 emits red light which is projected onto and through primary lens 61'. The red light R is then focused upon the front surface of secondary lens 123 of lenticular array 12.

Projection of the green component 42 from its associated subpixel of the image is illustrated in conjunction with the next pixel, 112, of the pixel array 11. The green component of the image is emitted from the center subpixel 42 of the pixel 112, and is projected through primary lens 62'. This light G is similarly focused on the front surface of lens 123.

Finally, projection of the blue component 43 from its associated subpixel of the image is illustrated with respect to the next pixel, 113', of the pixel array. The blue component B is projected through primary lens 61" onto a portion of lens 124 of lenticular array 12.

Of course, each pixel of array 11 emits red, green and blue components which are blended to form a color image, as is well known. In the preceding description, the respective components are illustrated separately with respect to different pixels merely for clarity. Composite red, green, blue images from the pixels a pixel pair, projected through a pair of primary lenses of array 60, is illustrated at the right-most portion of FIG. 7B. As indicated by reference character C, a pair of color pixels project image information comprising red, green and blue portions, through a corresponding pair of primary lenses of array 60 onto associated lens 125 of array 12.

With images projected from the pixels of pixel array 11 through the primary lenses of array 60 to the lenticular array 12, the apparatus then functions in the manner described above with respect to FIGS. 1–5 to provide stereoscopic images (left and right eye images) to a viewer. The pitch of secondary lenses in array 12 is smaller than the pitch of the primary lenses of array 60. Therefore, the groups of primary lenses in array 60 are offset from the secondary lenses in array 12 with the amount of offset increasing as one moves further from the center of the display, substantially in the same manner as described with respect to the progressive offsets of pixel pairs to lenses of array 12 in FIGS. 1A and 1B.

As illustrated in FIG. 7B, there is a spacing d1 between lenticular array 60 of primary lenses and lenticular array 12 of secondary lenses. There is also a distance d2 between pixel array 11 and lenticular array 60. These distances, and the focal length of the lenses in array 60, are selected so that light emitted from pixels in array 11 will be focused upon the front surface of the secondary lenses 123–125 of lenticular array 12. The space between the pixel array 11 and lenticular array 60 is typically occupied by air. However, within the contemplation of the present invention this space may be evacuated or filled with any optically transparent material, such as glass.

The primary lenticular array 60 and the secondary lenticular array 12 may be separate elements separated in any of the above-described ways such as by air, vacuum or an optically transparent material. However, in one preferred embodiment, the primary lenticular array 60 and the secondary lenticular array 12 are formed on opposed surfaces of a single optical substrate. The primary lenticular array 60 and the secondary lenticular array 12 may be formed as a single unitary structure by any suitable process including a mask etching technique such as grey scale masking. They may further be constructed by a suitable molding technique out of a suitable optically transparent material such as plastic or glass.

It is noted that the embodiment of FIG. 6 is similar to the embodiment of FIG. 1B in that the axis of central lens 124 is aligned with the line 15 bisecting the intended viewing position for the display. However, it is also possible to construct a device in accordance with the principles of FIG. 6 in the same manner as the device of FIG. 1A, wherein line 15 falls between lenses of lenticular array 12. Similarly, a device embodying the structure and principles of operation of FIGS. 6–7B may be employed to provide more than two images by providing sets of pixels and corresponding sets of primary lenses comprising more than two lenses and pixels in each set.

The embodiments described above with respect to FIGS. 6 and 7A,B may also be used in a display embodying the techniques of FIG. 5 of the present application. In such a case more than two of the primary lenses 60 will be registered to a single secondary lens 12 to produce more than two views of the image information as explained above. This results in the an increased number of perspective views of the image at the expense of a decreased resolution per image.

While there have been illustrated and described what are at present considered to be preferred embodiments of the present invention, it will be understood by those skilled in the art that various changes and modifications may be made, and equivalents may be substituted for elements thereof without departing from the true scope of the present invention. For instance, the term lenticular array may be interpreted to include various arrangements of lens structures such as cylindrical lenses or microlenses. This applies equally to arrays 12 and 60. In addition, various types of displays may adapt the concepts of this invention, including flat panel displays such as electroluminescent (EL) displays, field emission displays (FED), vacuum fluorescent (VF) displays, liquid crystal (LC) displays, organic light emitting diode (OLED) displays, high temperature poly-silicon (HTPS) and low temperature poly-silicon (LTPS) displays, and LED displays.

In view of the foregoing disclosure, one of ordinary skill would readily appreciate that any data structure capable of achieving the display described herein could be used to drive this display device. Several preferred data structures are described in copending application entitled "AN AUTOSTEREOSCOPIC DISPLAY SYSTEM AND A DATA STREAM AND METHOD THERFOR", by Rodney L. Clark, Daniel M. Brown, John Karpinsky and Peter Erbach, filed in the U.S. Patent and Trademark Office by Express Mail on Jan. 25, 2000 and commonly owned with the present application, the contents of which application are incorporated into this application in their entirety.

In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. An autostereoscopic display supplying a viewer with a stereoscopic image when viewed from an intended perspective, comprising:
   a pixel array including individual pixels each having subpixel elements, N individual pixels being arranged into an individual pixel groups, wherein N is equal to the number of individual perspective images to be displayed, each said pixel including plural subpixels extending in a horizontal direction from the viewer's intended perspective and forming a part of an individual perspective image;
   a first lenticular array positioned vertically from the viewer's intended perspective and focusing light from said subpixels of each said pixel to a single spatial point between said pixel array and the viewer; each said pixel group in the horizontal direction being focused by a different first lens of said first lenticular array; and
   a second lenticular array positioned between said first lenticular array and the viewer such that images projected from different pixels of each pixel group are directed to a different location at an intended viewing point, the spacing of the images from each pixel of said pixel groups being separated at the intended viewing position at about the spacing between human eyes to thereby display said plural images stereoscopically, wherein said first lenticular array focuses said subpixels to the surface of a lens of said second lenticular array.

2. The display of claim 1 where N is two, a first individual perspective being supplied to a left eye position while a second individual perspective is supplied to a right eye position.

3. The display of claim 1 wherein N is greater than two.

4. The display of claim 1 wherein said plural subpixels of each said pixel include a red subpixel, a green subpixel and a blue subpixel.

5. The display of claim 1 wherein each of said first and second lenticular arrays is formed of a plurality of cylindrical lenses.

6. The display of claim 5 wherein said cylindrical arrays of said first and second lenticular arrays extend generally parallel to each other.

7. The display of claim 6 wherein said first and second lenticular arrays are formed on the opposed sides of a single optical element.

8. An autostereoscopic display, comprising:
   a pixel array including several pixel groups;
   a first lenticular array positioned between the pixel array and a viewer, said first lenticular array comprising a plurality of first lenses corresponding respectively to the pixels of the pixel array such that such that the lenses of said first lenticular array include a plurality of first lens groups corresponding to said pixel groups; and
   a second lenticular array positioned between the first lenticular array and a viewer such that images projected from first lenses within each first lens group pass through a corresponding one of several lenses within the second lenticular array, wherein a pitch of lenses within the second lenticular array differs from a pitch of the first lens groups within the first lenticular array where a stereoscopic image is produced by at least one of said first and second lenticular arrays.

9. A display as recited in claim 8, wherein the pitch of the first lenses of said first lenticular array is substantially the same as the pitch of the pixels of said pixel groups.

10. A display as recited in claim 8, wherein the pitch of the lenses of said second lenticular array is smaller than the pitch of the lenses of the first lens groups.

11. A display as recited in claim 8, wherein said pixels are color pixels.

12. A display as in claim 11, wherein each of said color pixels comprises a plurality of color components arranged in a first direction, and said first lenses of said first array comprise cylindrical lenses having axes extending perpendicular to said first direction.

13. A display as in claim 11, wherein each of said color pixels comprises a plurality of color components arranged in a horizontal direction with respect to the display, and said first lenses of said first array comprise cylindrical lenses having axes extending vertically with respect to the display.

14. A display as recited in claim 8, wherein the images simultaneously displayed by different pixels within each of several adjacent pixel groups include different views of a single scene to enable a stereoscopic effect.

15. A display as recited in claim 8, wherein each lens within the second lenticular array is offset from a corresponding first lens group within the first lenticular array relative to an axis orthogonal to the first lenticular array, the offset increasing based on a distance from the lens of the second array to a center of the autostereoscopic display.

16. A display as recited in claim 8, wherein the first lenticular array is separated from the pixel array by a first predetermined distance and said second lenticular array is separated from the first lenticular array by a second predetermined distance.

17. A display as recited in claim 8, wherein the first and second lenticular arrays are retrofit to a display after the display is fabricated.

18. A method of displaying multidimensional images on an autostereoscopic display, comprising:
   generating images using a pixel array including several pixel groups;
   projecting the images generated by each pixel through a corresponding plurality of first lenses of a first lenticular array, thereby projecting the images through several first lens groups; and
   projecting the images projected through each first lens group through a different and corresponding one of several second lenses within a second lenticular array that is positioned between the first lenticular array and a viewer, the further projecting involving projecting the images through second lenses having a pitch that differs from a pitch of the first lens groups within the first lenticular array.

19. A method as in claim 18, comprising generating images with color pixels, each of said color pixels comprising a plurality of color components arranged in a first direction, said first lenses of said first array comprising cylindrical lenses having axes extending perpendicular to said first direction.

20. A method as recited in claim 18, wherein the generating images comprises:
   simultaneously displaying different views of a single scene on different pixels within each of several adjacent pixel groups to enable a stereoscopic effect.

21. A method as recited in claim 18, wherein the projecting comprises:
   projecting the images through second lenses within the second lenticular array that are each offset from corresponding pixel groups within the pixel array and from first lens groups in the first lenticular array relative to an axis orthogonal to the pixel array, the offset increasing based on a distance from each particular second lens to a center of the pixel array.

22. A method as recited in claim 18, wherein the projecting comprises:
   projecting the images through first lenses within the first lenticular array that are separated from the pixel array by a first predetermined distance, and projecting images from the first within the first lenticular array through second lenses in the second lenticular array that are spaced from the first lenticular array by a second predetermined distance.

23. A method as recited by claim 18, further comprising retrofitting the first and existing display having the pixel array.

* * * * *